Figure 4:
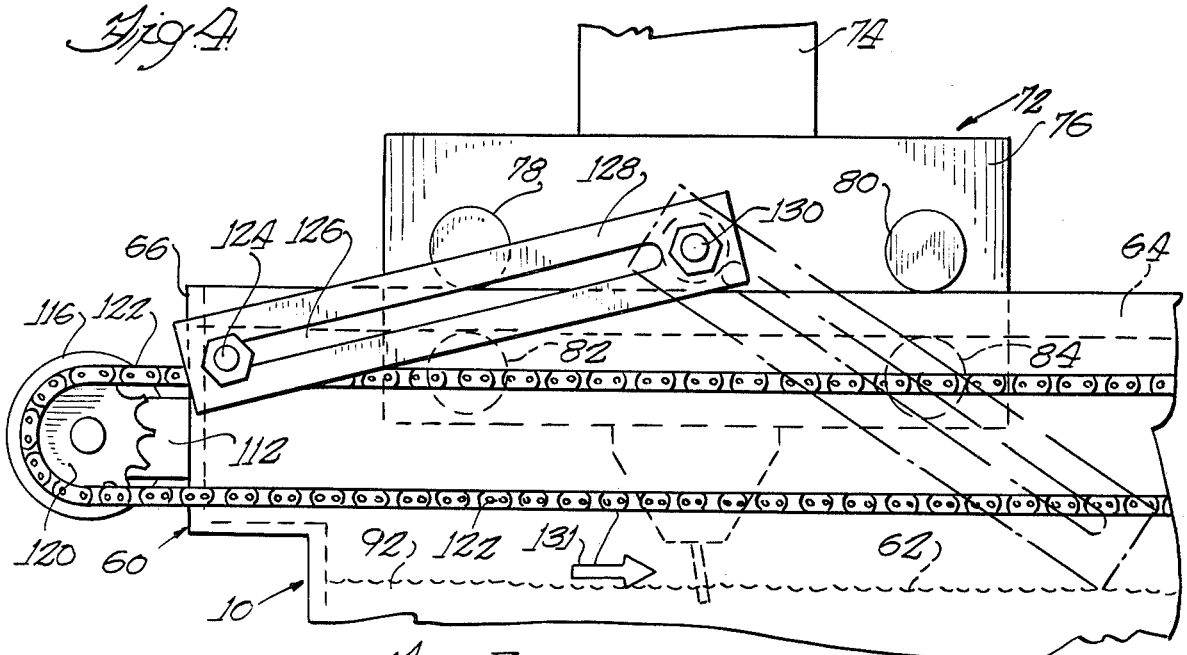

United States Patent [19]
Russell et al.

[11] 3,935,104
[45] Jan. 27, 1976

[54] AUTOMATIC FOAM REMOVER FOR FLOTATION TANKS

[75] Inventors: Charles E. Russell, Wayne; Fred E. Russell, Elgin; Melvin B. Pearson, Hoffman Estates, all of Ill.

[73] Assignee: Waste Water Systems, Inc., Hoffman Estates, Ill.

[22] Filed: Mar. 20, 1974

[21] Appl. No.: 453,174

[52] U.S. Cl. .................. 210/97; 210/221; 210/527
[51] Int. Cl.². .......................................... B01D 21/24
[58] Field of Search ....... 210/44, 97, 221, 241, 525, 210/527, 230; 55/178; 209/170

[56] References Cited
UNITED STATES PATENTS

| | | | |
|---|---|---|---|
| 2,101,081 | 12/1937 | Lund | 210/527 |
| 3,004,672 | 10/1961 | Conley et al. | 210/527 X |
| 3,284,993 | 11/1966 | Sebald et al. | 210/527 X |
| 3,306,455 | 2/1967 | Lismer | 210/230 |
| 3,396,102 | 8/1968 | Forrest | 210/527 |
| 3,498,466 | 3/1970 | Lechter et al. | 210/525 |
| 3,598,240 | 8/1971 | Abe et al. | 210/230 |
| 3,642,617 | 2/1972 | Brink | 210/221 |
| 3,705,650 | 12/1972 | Gotte | 210/221 |
| 3,769,207 | 10/1973 | Baer | 210/221 |
| 3,797,664 | 3/1974 | Pentz et al. | 210/527 |

*Primary Examiner*—Theodore A. Granger

[57] ABSTRACT

An automatic foam remover for a substantially rectangular flotation tank in which during operation thereof a layer of foam accumulates on the top surface of a liquid body therein, said foam remover comprising a hollow beam extending horizontally across the top of the tank and being movable back and forth between two parallel side walls of the tank by means of motor-driven endless chains mounted on the tank and operably connected with said beam, the hollow interior of which is in communication with a source of vacuum. Said hollow beam is provided with a longitudinal bottom slot through which a vane which is pivotally mounted within the hollow beam, extends downwardly through said layer of foam, whereby said vane during the movement of the beam is alternately forced into engagement with the two edges of said slot and thereby causes the layer of foam to be subjected to the action of the source of vacuum alternately at one side of the vane and at the other side thereof.

5 Claims, 8 Drawing Figures

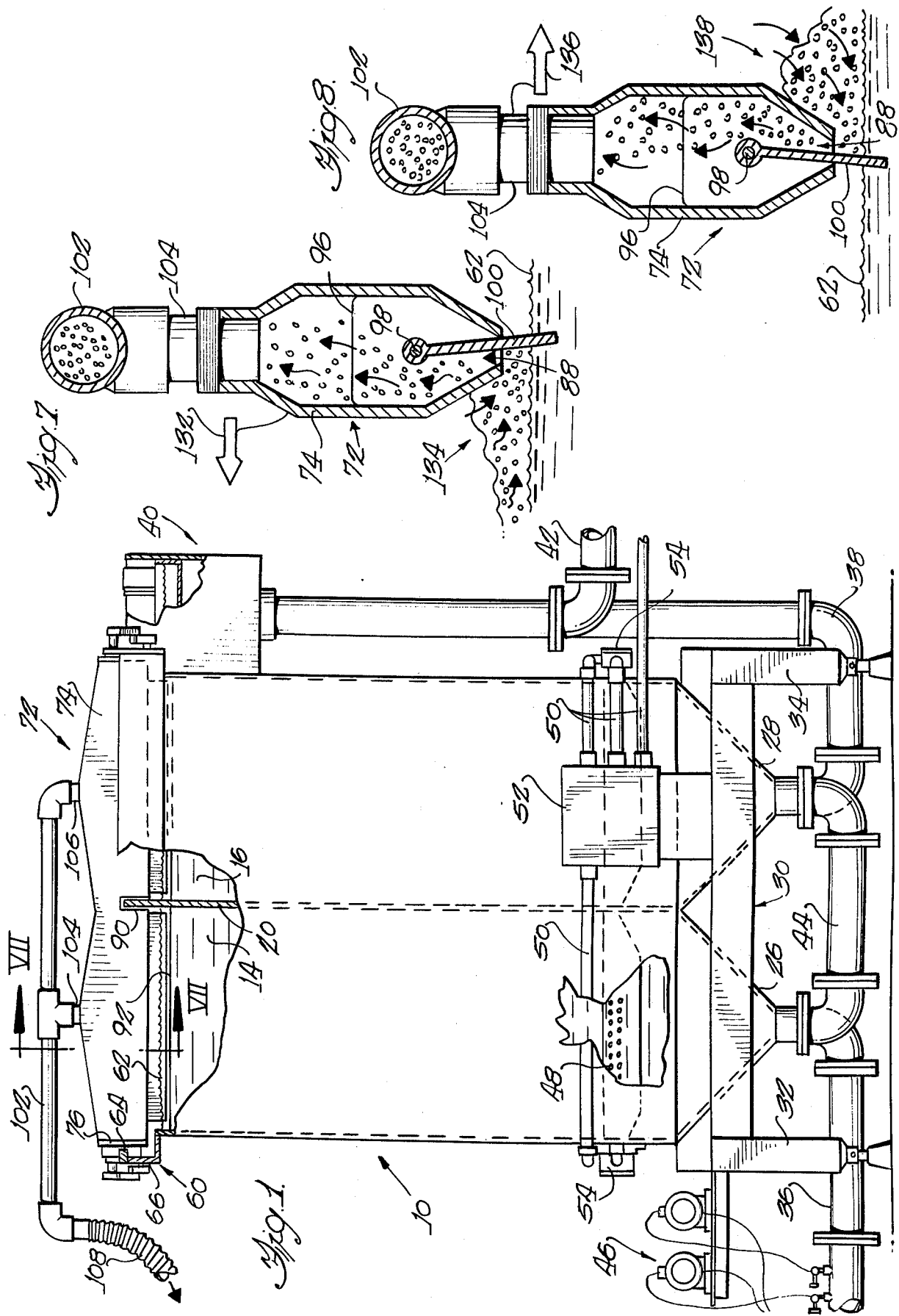

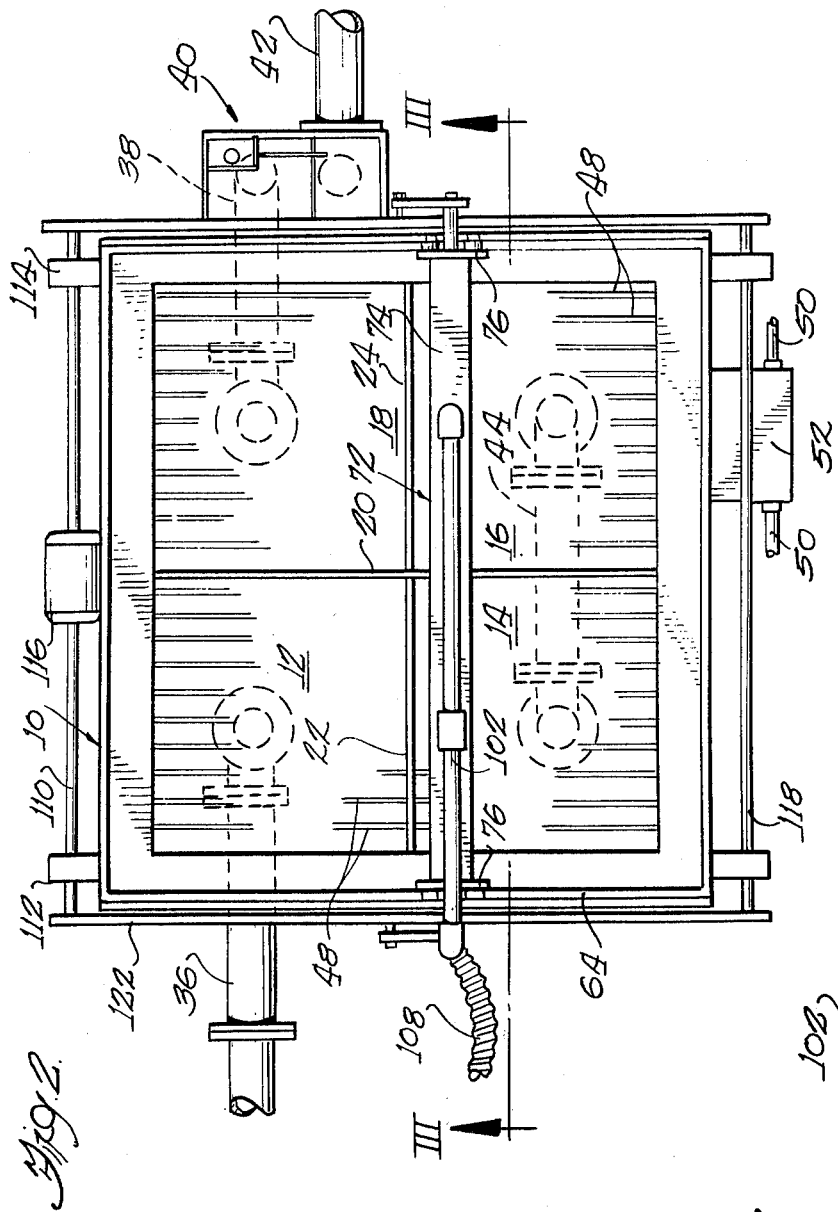

AUTOMATIC FOAM REMOVER FOR FLOTATION TANKS

This invention relates to improvements in automatic foam removing means for industrial flotation apparatus for separation of suspended solids and immiscible liquids from a liquid body by causing a multiplicity of gas bubbles to rise from the lower regions of said liquid body to the surface thereof while carrying said solids and/or immiscible liquids with them which results in the formation of a layer of foam, froth or sludge on said surface. The gas bubbles may be produced by various means well known in the art which form no part of the present invention.

An object of the invention is to provide in apparatus of the kind indicated above a novel and improved foam remover which is extremely efficient in operation and at the same time simple and inexpensive to manufacture, install and maintain.

Another object of the invention is to provide a foam remover of the kind indicated in which vacuum means are utilized for the removal of the foam.

A further object of the invention is to provide in apparatus of the kind indicated, particularly in such apparatus which include a tank of substantially rectangular cross-section, a foam remover which is adapted to reciprocate across the top of the tank between two opposite sides thereof, and which is provided with depending, pivotally mounted vane means extending through the layer of foam between the two other sides of the tank.

Yet another object of the invention is to provide a foam remover of the type indicated which comprises a hollow beam provided at both ends thereof with rollers mounted for rolling engagement with parallel guide rails secured to said opposite side walls of the tank adjacent the top edge thereof, said beam being operatively connected at both ends thereof with drive means mounted on said tank and adapted to move said beam back and forth between two end positions, having its hollow interior in communication with a vacuum source.

A further object of the ivention is to provide a foam remover of the kind indicated, in which said hollow beam is provided with a longitudinal bottom slot through which vane means extend downwardly, said vane means being pivotally mounted within said hollow beam for alternating engagement with the two edges of said slot as the beam is being moved back and forth through the layer of foam on top of said liquid body, thereby connecting said vacuum source through said hollow beam with the layer of foam alternatingly at one side of said vane means and at the other side thereof.

Other objects and advantages of the invention will become apparent from the following detailed description of preferred embodiments thereof, with reference to the accompanying drawings, in which:

FIG. 1 is a side view and partial section of an electrofloration apparatus provided with the novel foam removing means, FIG. 2 is a top view of said apparatus, FIG. 3 is a cross-section on line III — III of FIG. 2, drawn to a larger scale.

Figure 5:
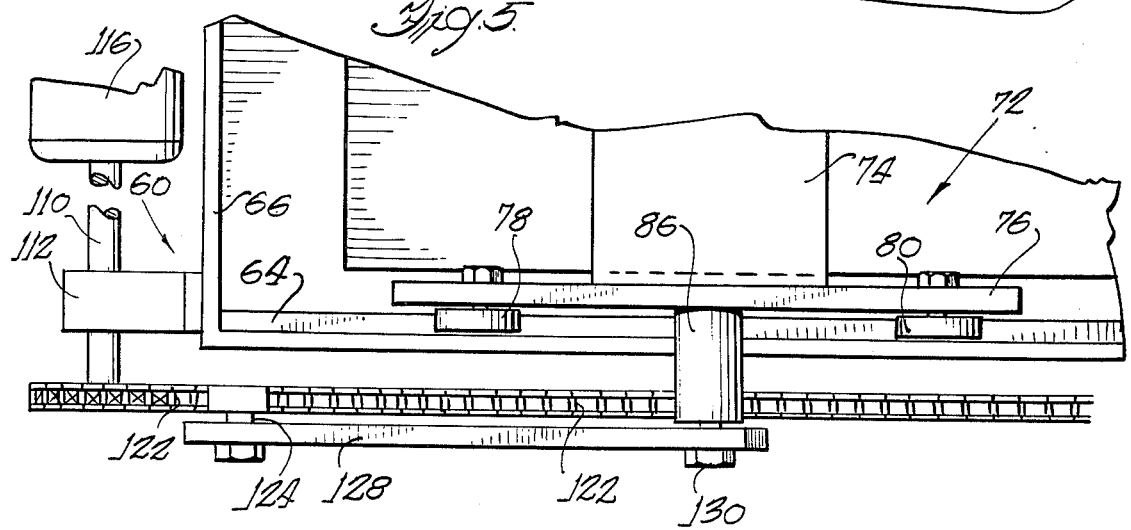
Figure 6:
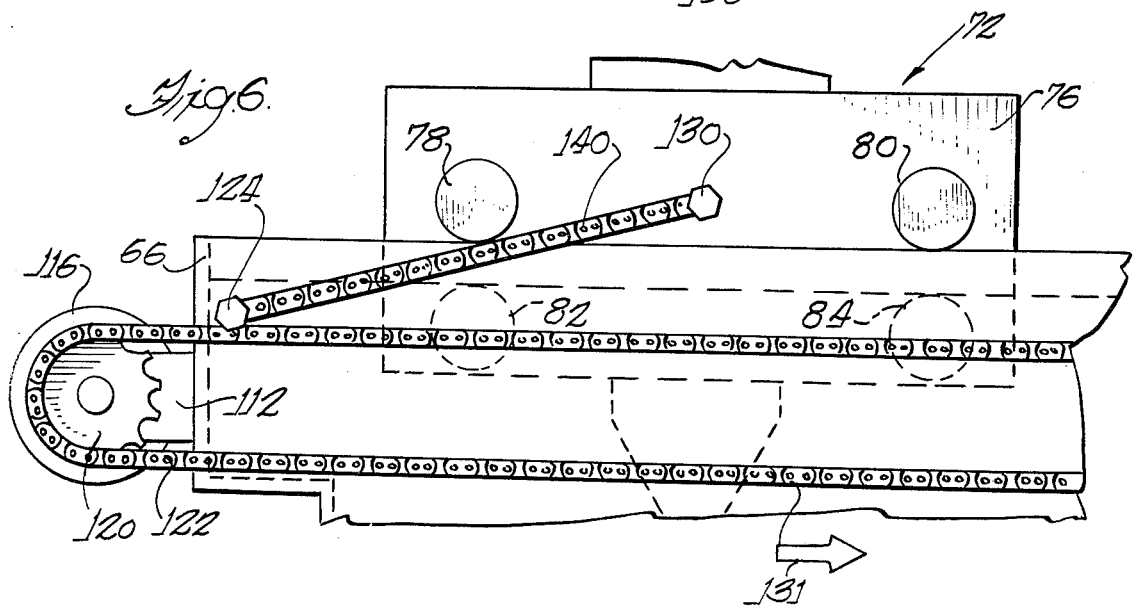

FIG. 4 is a partial elevational view of the upper portion of the apparatus, seen in the direction of the arrow A in FIG. 3, FIG. 5 is a top view of the portion of the apparatus shown in FIG. 4, FIG. 6 is an elevational view similar to FIG. 4, of another embodiment of the invention, FIG. 7 shows a cross-section on line VII — VII of FIG. 1, and FIG. 8 shows the same cross-section as FIG. 7 with parts in a different operational position.

With reference particularly to FIGS. 1, 2 and 3, a tank 10 of substantially square cross-section is divided into four compartments 12, 14, 16 and 18 by vertical partition walls 20 and 22, 24. Each compartment is provided with a separate funnel-shaped bottom as indicated at 26 and 28 for compartments 14 and 16, respectively, and the tank 10 is supported on a base frame 30 which includes four corner legs, two of which are shown at 32 and 34. An influent pipe 36 is connected to the bottom of compartment 12, and an effluent pipe 38 provides communication between the bottom of compartment 18 and the bottom of a weir box 40 mounted exteriorly near the top of the tank 10. A discharge pipe 42 is connected to the bottom of the weir box 40, and a pipe 44 establishes communication between compartments 14 and 16 at the bottoms thereof. Means for controlled supplying of special treatment chemicals to the influent pipe 36 are indicated generally at 46, and a plurality of electrodes 48 with electrical connection lines 50 and coupling boxes 52, 54 are shown in a general way only and not described in detail, since neither said treatment means 46 nor said electrical means 50, 52, 54 form any part of this invention.

The top of the tank 10 is provided with a peripheral enlargement, as shown at 60, which is located entirely abovethe intended liquid level 62 in the tank, as determined by the weir box 40. A straight guide rail 64 is secured to the inside of the enlargement wall 66 near the top edge thereof, and a similar guide rail 68 is secured to the opposite enlargement wall 70 at the same level, as indicated in FIG. 3. A foam remover assembly 72 comprises a hollow horizontal beam 74 (see also FIGS. 7 and 8) which at each end is provided with a vertical end plate 76 carrying on its outside surface four rotatably mounted rollers 78, 80, 82, 84. When the foam remover 72 is in operative position across the top of the tank 10, two of said rollers 78, 80 are in engagement with the top surface of the corresponding guide rail 64 or 68 while the other two rollers 82, 84 are in engagement with the bottom surface of said guide rail. A horizontal pin 86 is secured to each of the end plates 76 and extends transversely outwardly therefrom at a level above the top edge of the enlargement wall 66, 70 for a purpose to be explained below.

The hollow beam 74 extends between the end plates 76 and in the embodiment shown particularly in FIGS. 7 and 8 the lower portions of its side walls are inclined inwardly to form between them a longitudinal bottom slot 88 in the beam. A recess 90 in the side walls of the beam 74 extends upwardly from the bottom thereof at the middle of the length of the beam to receive the top portion of the partition wall 20 in the tank 10. The top edge 92 of the partition walls 22, 24 is disposed below the intended liquid level 62. The recess 90 is surrounded by side walls 94 and a top wall 96, and in each of said side walls 94 and the corresponding end plate 76 a shaft 98 is rotatably mounted. Each of said aligned shafts 98 has secured thereto a vane 100 which extends downwardly through the corresponding portion of the slot 88 to below the intended liquid level 62 in the tank 10 but short of the top edge 92 of the partition walls 22, 24. A horizontal pipe 102 extends above the hollow beam 74 longitudinally thereof and is in communication with the interior of said hollow beam by branch pipes 104, 106 located equidistantly from the recess 90. One end of said pipe 102 is connected with a vacuum source (not shown) by means of a flexible hose 108.

A shaft 110, parallel with the hollow beam 74, is rotatably mounted in bearings 112, 114 which are secured to the outside of the enlargement wall 66, and said shaft 110 is connected to be driven by an electric motor 116 which is also mounted on said enlargement wall 66. At the opposite side of the tank 10 a second shaft 118 is similarily mounted in parallel with shaft 110. Each of the shafts 110, 118 is provided at each end with a sprocket wheel 120, and a chain 122 is trained over each pair of sprocket wheels 120 mounted on corresponding ends of the shafts 110, 118. A pin 124 is secured to the chain 122 and extends transversely outwardly therefrom into a longitudinal slot 126 in a puller arm 128 which at one end thereof is pivotally mounted on a decreased diameter end extension 130 of the pin 86 on the beam end plate 76.

In operation, the waste liquid enters through the influent pipe 36 and flows upwardly through compartment 12 between the electrodes 48, over the top of partition wall 22, downwardly through compartment 14 between other electrodes, through pipe connection 44, upwardly through compartment 16 between another set of electrodes, over the top of partition wall 24, downwardly through compartment 18 between yet another set of electrodes, through pipe 38 to the weir box 40 and out through discharge pipe 42. As is well known in the art, the electrodes, when energized, cause the formation of gas bubbles which rise upwardly in all four compartments of the tank and accumulate as a layer of foam on the surface of the liquid body which is maintained at the constant level 62 by the action of the weir box 40. Said layer of foam is separated into two portions by the upwardly projecting partition wall 20, one portion covering the compartments 12 and 14 and the other portion covering the compartments 16 and 18.

When the electric motor 116 is started, the chains 122 are driven in synchronism with the lower reaches thereof moving in the direction indicated by arrow 131 in FIG. 4, thereby pulling the foam remover beam 74 to the left in FIG. 4 through the intermediary of the puller rod 128. This movement of the beam 74 is slow, and the inter-engagement of the rollers 78, 80, 82, 84 and the guide rails 64, 68 maintains the beam 74 on a straight horizontal course. While the pins 124 proceed around the sprocket wheels 120, the beam 74 comes to a standstill with the lefthand edge of the end plates 76 in close vicinity to the enlargement wall 66, and as the pins 124 begin their return movement with the lower reach of the chains 122, the pins 124 move slowly in the slots 126 toward the right in FIG. 4, at the same time forcing the puller rods 128 to rotate on the pin extensions 130 in the counter-clockwise direction as seen in FIG. 4. When the puller rods 128 pass their vertical center position, the movement of the pins 124 in the slots 126 is reversed, and when said pins 124 again reach the end of the slots 126, the beam 74 begins its reverse movement (towards the right in FIG. 4). This operation is repeated when the beam 74 reaches the opposite side of the tank, with the difference that the pins 124 then move around the sprocket wheels 120 in the opposite direction, i.e. upwardly rather than downwardly.

During the movement of the beam 74 across the tank the lower edge portions of the vanes 100 move in the liquid body slightly below the liquid level 62. Accordingly, when the beam 74 moves in the direction indicated by the arrow 132 in FIG. 7, the bottom portion of the vanes 100 is subject to resistance by the liquid, and the portion of the vanes above the liquid level 62, as well as the beam 74 itself, are subject to movement resistance by the foam layer, as indicated at 134 in FIG. 7, with the result that the vanes 100 are forced against the righthand edge (in FIG. 7) of the slots 88 and the suction action from the vacuum source transmitted through the conduit means 108, 102, 104, 106 forces the accumulated foam at 134 out through said conduit means to a place of disposal or further treatment. When the beam 74 moves in the opposite direction, as indicated by arrow 136 in FIG. 8, similar conditions prevail with the vanes 100 against the other edge of the slots 88 and the accumulated foam at 138 subjected to the vacuum action.

Thus, by properly coordinating the flow velocity through the tank and the speed of the reciprocatory movement of the beam 74, the foam continuously accumulating on the surface of the liquid body can be continuously removed therefrom.

In the embodiment of FIG. 6 the puller rod 128 is replaced by a simple flexible chain 140 of any suitable kind which has its end connected to the pins 124, 130 or to sleeves (not shown) rotatably mounted on said pins. Obviously, as the distance between the pins 124 and 130 varies during the movements of the chains 122 and the foam remover beam 74, the chains 140 are alternately slackened and straightened out to full length, with the same effect as described above.

Various modifications of the embodiments shown and described are feasible, and the invention is not limited to said embodiments other than as defined in the appended claims.

What we claim is:

1. In a flotation tank of substantially rectangular cross-section for treatment of waste water therein by causing the formation of gas bubbles which rise through the waste water body carrying insoluble and immiscible matter in the waste water with them to the surface of said body to form a layer of foam, froth or sludge on said surface which is maintained at a constant level by overflow means connected with the tank, an automatic foam remover comprising:
   a. a hollow beam extending horizontally across the top portion of said tank between two opposite side walls thereof and having its bottom edge at a distance above said waste water level with a downwardly open slot extending along said bottom edge,
   b. an elongate substantially flat-faced vane mounted within said hollow beam for pivotal movement on a horizontal axis above said slot and extending downwardly through said slot to a level below the surface of said waste water body, said slot being of significantly greater width than the thickness of said vane,
   c. conduit means providing communication between a vacuum source and the interior of said hollow beam, d. means at the ends of said beam supporting said beam for translatory movement on guide rails provided on said tank and extending along said two opposite side walls thereof,
e. a horizontal shaft rotatably mounted on the outside of said tank and extending transversely of said guide rails,
f. a sprocket wheel secured to each end of said shaft,
g. an endless drive chain trained over each of said sprocket wheels and over an idler sprocket wheel at the opposite side of the tank,
h. drive means operatively connected with said shaft for moving said endless drive chains in synchronism with each other continuously in one direction,
i. a first horizontal lateral projection on each of said chains in alignment with each other,
j. a second horizontal projection on each end of said beam and extending longitudinally of said beam outwardly above the top edge of said tank,
k. link means connecting said first and second projections at each end of said beam, said link means being of variable effective length to permit variation of the distance between said first and second projections as said first projections pass around the sprocket wheels in the reversal of the direction of movement of said beam, whereby movement of said beam in one direction tends to cause compression of the foam in front thereof and thereby causes said vane means to pivot into engagement with the rear edge of said slot and thus subjects said foam in front of the vane means to the suction action of said vacuum source and thereby causes discharge of said foam through said conduit means, the operation being repeated during the reverse movement of said beam, this time with said vane means in engagement with the other edge of said slot.

2. An automatic foam remover according to claim 1, wherein said link means are flexible to enable their points of attachment to said drive chains to move around said sprocket wheels, while said hollow beam is at a standstill in either of its end positions.

3. An automatic foam remover according to claim 1, in which said link means each comprises a flexible element having its ends connected with said first and second horizontal projections at one side of said tank.

4. An automatic foam remover according to claim 3, including a sleeve secured to each end of said flexible element and mounted for rotation on said first and second horizontal projections.

5. An automatic foam remover according to claim 1, in which said link means each comprises an elongated rigid element having a closed longitudinal slot therein, said second horizontal projection comprising a pin on which said elongate element is rotatably mounted, and said first horizontal projection being slidably received in said longitudinal slot.

* * * * *